United States Patent
Bassett et al.

(10) Patent No.: US 10,697,573 B2
(45) Date of Patent: Jun. 30, 2020

(54) PLUMBING FITTING ASSEMBLY FOR TRANSVERSE HOLE IN STRUCTURE

(71) Applicants: Kenny Bassett, Columbia, MO (US); Delvin C. Mellerup, Clark, MO (US)

(72) Inventors: Kenny Bassett, Columbia, MO (US); Delvin C. Mellerup, Clark, MO (US)

( * ) Notice: Subject to any disclaimer, the term of this patent is extended or adjusted under 35 U.S.C. 154(b) by 250 days.

(21) Appl. No.: 15/634,328

(22) Filed: Jun. 27, 2017

(65) Prior Publication Data
US 2018/0372257 A1 Dec. 27, 2018

(51) Int. Cl.
| | |
|---|---|
| F16L 41/14 | (2006.01) |
| F16L 37/00 | (2006.01) |
| B25B 13/50 | (2006.01) |
| B25B 13/48 | (2006.01) |
| B25B 27/10 | (2006.01) |

(52) U.S. Cl.
CPC .............. *F16L 41/14* (2013.01); *B25B 13/48* (2013.01); *B25B 13/50* (2013.01); *B25B 27/10* (2013.01); *F16L 37/008* (2013.01)

(58) Field of Classification Search
CPC . F16L 41/14; F16L 37/008; F16L 5/02; F16L 19/0218; F16L 41/08; B25B 13/48; B25B 13/50; B25B 27/10; E03D 11/16; E03D 11/14
USPC ..... 285/39, 56, 57, 189, 193, 194, 195, 213, 285/219, 305, 353, 354, 357, 384, 386
See application file for complete search history.

(56) References Cited

U.S. PATENT DOCUMENTS

| | | | |
|---|---|---|---|
| 522,005 | A | 6/1894 | Burke |
| 2,514,504 | A | 7/1950 | Moline |
| 2,537,183 | A | 1/1951 | Bloomer |
| 3,405,958 | A | 10/1968 | Holdren |
| 3,841,667 | A | 10/1974 | Sands |
| 3,973,789 | A | 8/1976 | Kunz et al. |

(Continued)

FOREIGN PATENT DOCUMENTS

| | | |
|---|---|---|
| DE | 19629012 A1 | 1/1988 |
| DE | 102006014954 A1 | 4/2007 |

(Continued)

OTHER PUBLICATIONS

International Search Report, PCT/US18/38080, dated Aug. 30, 2018, 3 pages.

(Continued)

*Primary Examiner* — Zachary T Dragicevich
*Assistant Examiner* — William S. Choi
(74) *Attorney, Agent, or Firm* — Stinson LLP (57) ABSTRACT

A plumbing fitting assembly includes an anchor member for being received in a transverse hole in a structure. One end of the anchor member is externally threaded and the other includes a catch portion for engaging a surface of the structure adjacent the hole. The threaded end is threaded into a clamping member configured to form a seal with the opposite surface of the structure or another liquid conveying structure. The anchor member can include a tool formation for mating with a rotating structure of a tool. The assembly can include a lock ring for being lockingly received in an interior passage to prevent the catch portion from deflecting inwardly when installed. The plumbing fitting assembly can also be configured for forming a plumbing fitting at a transverse hole in a flexible, liquid-impermeable panel.

18 Claims, 9 Drawing Sheets

(56) References Cited

U.S. PATENT DOCUMENTS

| | | | |
|---|---|---|---|
| 4,234,218 A | 11/1980 | Rogers | |
| 4,448,447 A * | 5/1984 | Funk | F16L 37/008 |
| | | | 285/319 |
| 4,494,779 A | 1/1985 | Neff et al. | |
| 4,576,400 A | 3/1986 | Allred et al. | |
| 5,068,496 A | 11/1991 | Favalora | |
| 5,096,232 A | 3/1992 | Fond et al. | |
| 5,425,395 A | 6/1995 | Brennan | |
| 5,577,776 A | 11/1996 | Welch | |
| 5,667,257 A | 9/1997 | Butler et al. | |
| 6,179,340 B1 * | 1/2001 | Adolf | F16L 25/0036 |
| | | | 285/140.1 |
| 6,192,531 B1 | 2/2001 | Fritz et al. | |
| 6,394,690 B1 | 5/2002 | Bartholoma et al. | |
| 6,406,068 B1 | 6/2002 | Bartholomä et al. | |
| 6,725,788 B2 | 4/2004 | McCartney et al. | |
| 9,130,362 B2 | 9/2015 | Bingham, Jr. et al. | |
| 2002/0189674 A1 | 12/2002 | Meeder | |
| 2006/0170210 A1 | 8/2006 | Gross | |
| 2008/0030021 A1 | 2/2008 | Theilen | |
| 2011/0318099 A1 | 12/2011 | Le Quere | |
| 2014/0174818 A1 | 6/2014 | Bingham, Jr. et al. | |
| 2017/0205014 A1 | 7/2017 | Kelk | |

FOREIGN PATENT DOCUMENTS

| | | |
|---|---|---|
| DE | 202014100099 U1 | 1/2014 |
| FR | 2712062 A1 | 5/1995 |
| GB | 190813936 | 4/1909 |
| WO | 2014085867 A1 | 6/2014 |

OTHER PUBLICATIONS

Written Opinion, PCT/US18/38080, dated Aug. 30, 2018, 14 pages.
ESpace English Machine Translation of DE19629012A1, 5 pages.
ESpace English Machine Translation of FR2712062A1, 8 pages.

* cited by examiner

PLUMBING FITTING ASSEMBLY FOR TRANSVERSE HOLE IN STRUCTURE

FIELD

The present disclosure relates to plumbing fittings that facilitate moving water or other fluid from one space such as the inside of a pipe or a tank to another space such as outside the pipe or tank; i.e., fittings for being connected to a transverse opening of a structure, such as the wall of a pipe, the wall of a tank, a roof, a flexible panel of a bag, etc., to fluidly connect a passage, enclosure, or open space on one side of the structure to a liquid-receiving apparatus such as a pipe, a valve, a vessel, etc., on the other side of the structure.

BACKGROUND

Establishing a liquid-tight connection with the interior of a vessel, such as a tank or a pipe, through a transverse hole in the vessel wall can be difficult when access to the vessel interior is limited. Unilateral plumbing fittings such as those disclosed in International Patent Application Publication No. WO 2014/085867 can be installed without access to a vessel interior. But these devices have not garnered significant commercial appeal, likely due to the connections being unreliable and/or difficult to install.

Many liquid-tight structures are flexible. For example, roofing membranes, plastic bags, etc., are formed from flexible material that holds liquid in use. It may be necessary or helpful to connect these flexible structures to drain or supply fittings in a liquid-tight manner to control the flow of liquids through the flexible material.

SUMMARY

In one aspect, a plumbing fitting assembly for forming a plumbing fitting at a transverse hole in a structure comprises a clamping member comprising a distal end portion and a proximal end portion. The clamping member defines a liquid passage extending through the clamping member from a first port formed in the distal end portion through a second port spaced apart from the distal end portion. The distal end portion of the clamping member is internally threaded and has an end surface configured for receiving a seal that extends circumferentially about the first port for sealingly engaging a proximal side of the structure about the port. An anchor member comprises a distal end portion and a proximal end portion spaced apart along an axis and defines a liquid passage extending from the distal end portion through the proximal end portion. The anchor member is sized and arranged for being received in the transverse hole and the proximal end portion is configured for being threadably mated with the distal end portion of the clamping member when the anchor member is received in the transverse hole. At least a segment of the distal end portion is resiliently bendable in a radial direction. The distal end portion includes a radially outwardly extending catch portion defining a proximal-facing shoulder sized and arranged for being tightened against a distal side of the structure when the proximal end portion of the anchor member is threadably mated with the distal end portion of the clamping member. The distal end portion has an interior surface including an anchor member locking formation. A locking ring has a proximal end portion, a distal end portion, an outer surface, and an inner surface defining a liquid passage extending through the locking ring from the proximal end portion through the distal end portion. The outer surface includes a locking ring locking formation sized and arranged for complementary interlocking engagement with the locking formation of the anchor member. The locking ring is configured for insertion through the liquid passage of the anchor member along the axis of the anchor member whereby the locking formation of the locking ring lockingly engages the locking formation of the anchor member. In another aspect, a plumbing fitting assembly for forming a plumbing fitting at a transverse hole in a structure comprises a clamping member comprising a distal end portion and a proximal end portion. The clamping member defines a liquid passage extending along the axis from the proximal end portion through the distal end portion. The distal end portion of the clamping member is internally threaded and has an end surface configured for receiving a seal that extends circumferentially about the liquid passage for forming a liquid-tight seal between the distal end portion of the clamping member and a proximal side of the structure. An anchor member comprises a distal end portion and a proximal end portion spaced apart along an axis and defines a liquid passage extending from the distal end portion through the proximal end portion. The anchor member is sized and arranged for being received in the transverse hole and the proximal end portion is configured for being threadably mated with the distal end portion of the clamping member when the anchor member is received in the transverse hole in the structure. The distal end portion defines a plurality of axially extending fingers spaced apart from one another about the axis. Each finger includes a catch portion extending radially outwardly and defining a proximal-facing shoulder sized and arranged for being tightened against a distal side of the structure when the proximal end portion of the anchor member is threadably mated with the distal end portion of the clamping member. The fingers are resiliently bendable in a radial direction to insert the catch portions through the transverse hole. The proximal end portion of the anchor member has an interior surface defining at least one tool-receiving recess shaped and arranged for mating with a rotating structure of a tool inserted distally through the liquid passages of the clamping member and the anchor member to connect the anchor member to the tool for conjoint rotation with the tool about the axis of the anchor member for threadably advancing the anchor member into the clamping member using the tool.

In another aspect, a plumbing fitting assembly for forming a plumbing fitting at a transverse hole in a flexible, liquid-impermeable panel comprises an anchor member comprising a distal end portion and a proximal end portion spaced apart along an axis and defining a liquid passage extending from the distal end portion through the proximal end portion. The anchor member is sized and arranged for being received in the transverse hole and the proximal end portion is externally threaded for being threadably mated with an internally threaded passage in a liquid conveying apparatus when the anchor member is received in the transverse hole. The distal end portion defines a plurality of axially extending fingers spaced apart from one another about the axis. Each finger includes a catch portion extending radially outwardly and defining a proximal-facing shoulder. A rigid backing washer has a distal end, a proximal end, and a hole extending from the proximal end through the distal end sized for receiving the proximal end portion of the anchor member therethrough. The distal end is sized and arranged to engage the shoulders of the catch portions when the anchor member is received in the hole, and the proximal end is sized and arranged to engage a distal surface of the flexible panel when the anchor member is received in the transverse hole whereby the rigid backing washer compresses the flexible panel against the distal end portion of the clamping member when the clamping member is threadably tightened into the internally threaded passage.

Other objects and features will be in part apparent and in part pointed out hereinafter.

BRIEF DESCRIPTION OF THE DRAWINGS

Corresponding reference characters indicate corresponding parts throughout the drawings.

DETAILED DESCRIPTION

Figure 1:
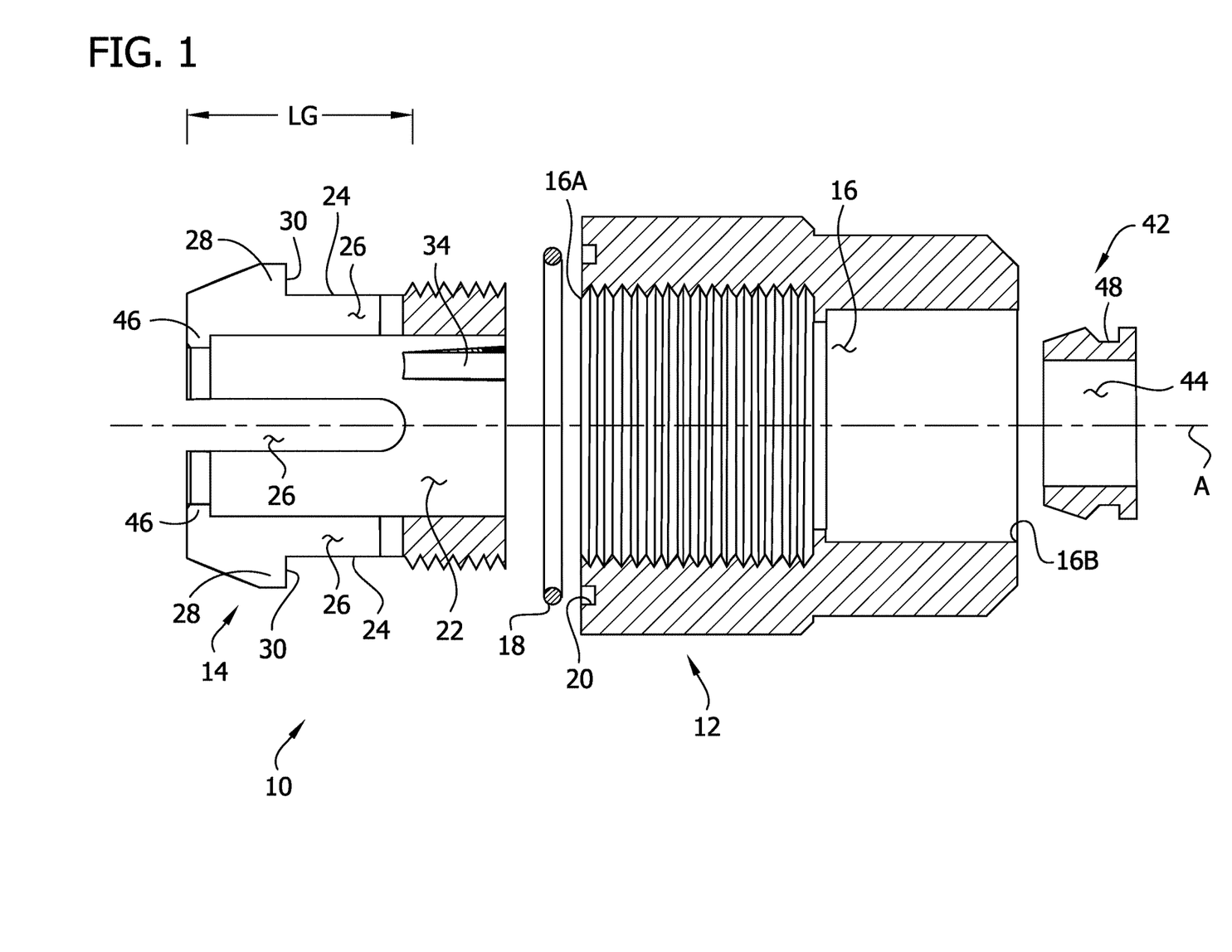
FIG. 1 is an exploded cross section of a plumbing fitting assembly.
Figure 2:
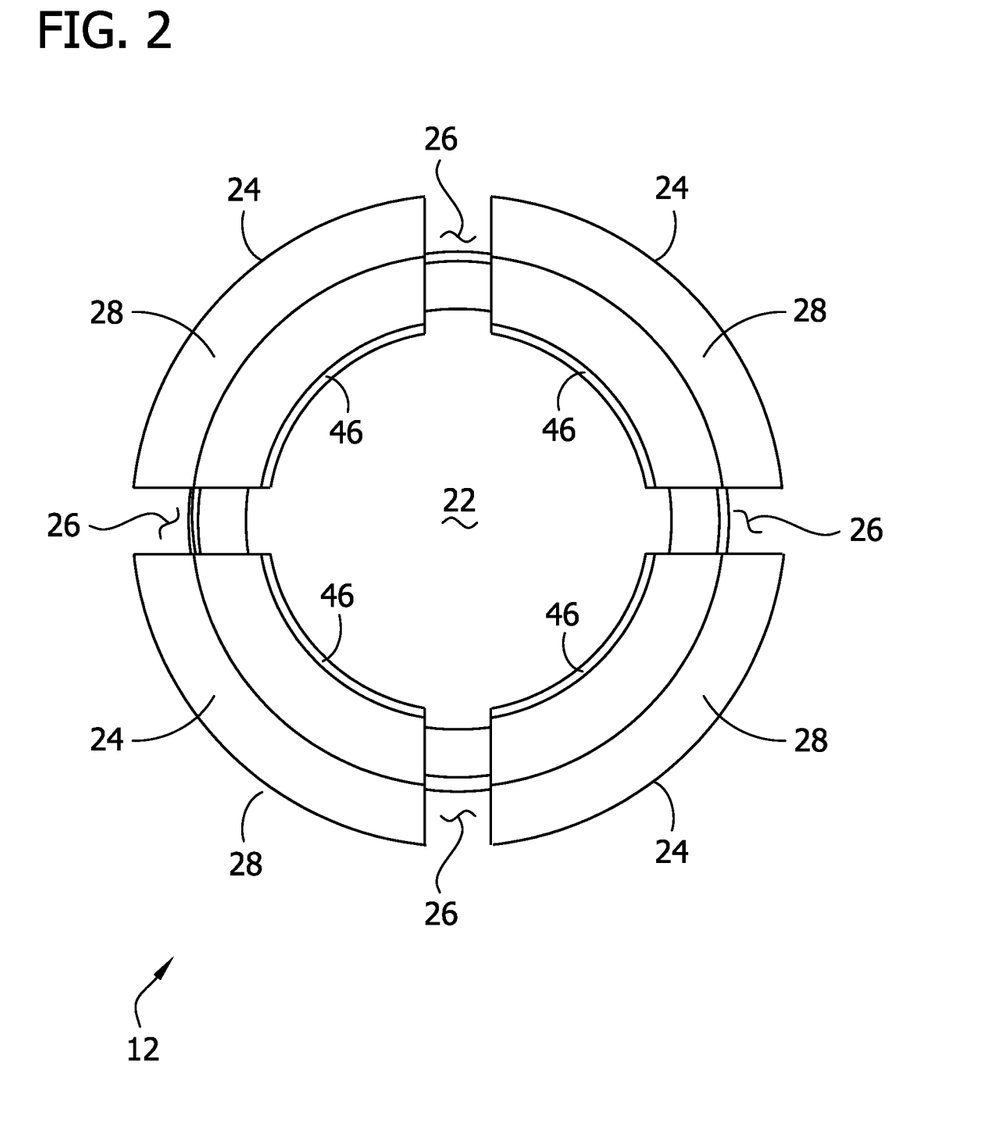
FIG. 2 is a distal end elevation of an anchor member of the plumbing fitting assembly.
Figure 3:
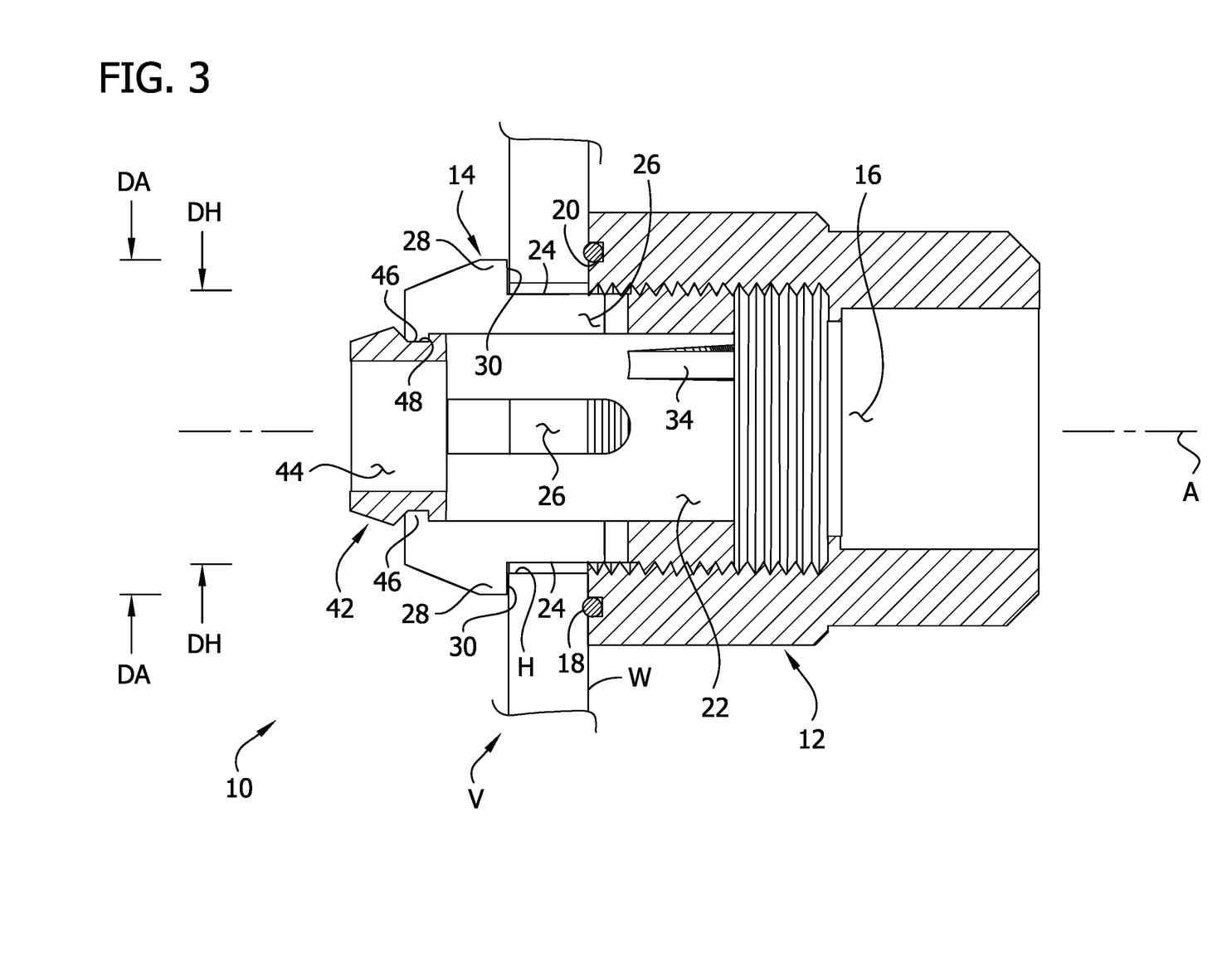
FIG. 3 is a cross section of the plumbing fitting assembly installed on the wall of a vessel.

Referring to FIGS. 1-3, one embodiment of a plumbing fitting assembly is generally indicated at reference number 10. As will be apparent, the plumbing fitting assembly 10 is usable in various configurations to form a liquid-tight connection between a vessel V (broadly, a structure), such as a pipe, a tank, a plastic bag, etc., and various liquid-receiving apparatuses, such as hoses, pipes, valves, etc., through a transverse hole H formed in the wall W of the vessel. Moreover, in certain embodiments, the plumbing fitting assembly 10 is installable in the hole H unilaterally, e.g., with only exterior access to the vessel V. As explained below, the plumbing fitting assembly 10 has features that ensure a reliable liquid-tight seal about the hole H and that enable installation with minimal tools and complexity. Furthermore, auxiliary components can be added to the assembly 10 to adapt the assembly for special-purpose uses and for particular types of vessels V.

The plumbing fitting assembly 10 includes a clamping member, generally indicated at 12, which has a proximal end portion and a distal end portion spaced apart along an axis A. In one or more embodiments, the clamping member 12 is a one-piece, unitary component formed by machining or injection molding a material suitable for receiving liquid (e.g., polymers and metals that are known or may become known to those skilled in the plumbing arts). The clamping member 12 defines a liquid passage 16 that extends through the clamping member from a first port 16A (FIG. 1) formed in the distal end portion through a second port 16B spaced apart from the distal end portion. In the illustrated embodiment, the passage 16 extends generally along the axis A and the second port 16B is formed in the proximal end portion of the clamping member 12, but other clamping members can define liquid passages having other shapes and arrangements.

In general and as explained in further detail below, the clamping member 12 functions as a support against which an anchor member, generally indicated at 14, is tightened to create a liquid-tight seal at an interface between the distal end of the clamping member and the opposing proximal surface of the vessel wall W (FIG. 3). The distal end portion of the clamping member 12 is internally threaded for threadably receiving the anchor member 14 (as explained below) and has an end surface configured for receiving a seal 18. In the illustrated embodiment, the end surface defines a groove 20 for receiving an O-ring 18 extending around the port 16A, but other embodiments can be configured to receive other kinds of seals that extend circumferentially about the distal port. In one or more embodiments, the proximal end portion of the clamping member 12 is configured to fluidly connect the second port 16B of the passage to a liquid-receiving device such as a pipe, a valve, a tank, etc. In the illustrated embodiment the proximal end portion of the clamping member is configured to connect the plumbing fitting assembly 10 to a liquid-receiving device by a solvent weld, but other embodiments can use other types of liquid-tight connections. In still other embodiments, the liquid-receiving device can be integrally formed with the proximal end portion of the clamping member.

The anchor member 14 has a distal end portion and a proximal end portion spaced apart along the axis A. In one or more embodiments, the anchor member 14 is a one-piece, unitary component formed by machining or injection molding a material suitable for receiving liquid (e.g., polymers and metals that are known or may become known to those skilled in the plumbing arts). The anchor member 14 defines a liquid passage 22 extending from the distal end portion through the proximal end portion along the axis A. The proximal end portion of the anchor member 14 is externally threaded for being threadably received in the internally threaded distal end portion of the clamping member 12. An intermediate portion of the anchor member 14 between the proximal and distal end portions is sized and arranged for being received in the hole H in the wall W of the vessel V as shown in FIG. 3 (e.g., an installer can drill a hole in the wall of the vessel to be sized for receiving the anchor member 14). As explained below, the distal end portion of the anchor member 14 is configured for opposingly engaging the distal surface of the vessel wall W when the intermediate portion is received in the hole H and the proximal end portion is threadably mated with the clamping member 12 on the proximal side of the wall.

A suitable anchor member 12 can be constructed so that at least one segment of the distal end portion is resiliently bendable in a radial direction with respect to the axis A. In one embodiment, the anchor member 12 comprises a plurality of axially extending fingers 24 that are circumferentially spaced apart about the axis A to define a plurality of axially extending gaps 26. For example, in the illustrated embodiment, the anchor member 14 defines four fingers 24 equally spaced apart by four gaps 26 (FIG. 2), but other embodiments can include other numbers and arrangements of fingers and gaps. Suitably, each of the fingers 24 is resiliently bendable in at least an inward radial direction. The distal end portion of each finger 24 includes a radially outwardly extending catch portion 28 defining a maximum effective diameter DA of the anchor member 14 that is larger than a diameter DH of the hole H (FIG. 3). Each catch portion 28 has an outer surface that slopes inwardly as it extends distally along a distal end segment. The sloped distal end segments of the catch portions 28 are configured as camming surfaces, to direct the fingers 24 to bend radially inward when the distal end portion of the anchor member 14 is inserted distally through the hole H in the wall W. Specifically, the sloped surfaces engage portions of the vessel wall W that define the hole H and slide along the surfaces as the anchor member 14 is forced in the distal direction along the axis A. When the effective diameter of the sloped surfaces of the catch portions exceeds the diameter DH of the hole, the sliding engagement causes the fingers 24 to bend radially inward to fit through the hole H. When the catch portions 28 pass through the hole H, the fingers resiliently return toward their unbent configurations as shown in FIG. 3. Accordingly, it is understood that the anchor member 12 can be operatively installed in the hole H when access is only available from the proximal side of the wall W (a unilateral installation).

The proximal end of each catch portion 28 defines a radially extending and proximal-facing shoulder 30. The shoulders 30 are sized and arranged for engaging (e.g., being tightened against) the distal side of the vessel wall W when proximal end portion of the anchor member 14 is received in the hole H. In the illustrated embodiment, the shoulders 30 extend generally perpendicular to the axis, but the shoulders can have other shapes and arrangements in other embodiments. When the proximal end portion of the anchor member 14 is received in the hole H and threadably mated with the distal end portion of the clamping member 12, the vessel wall W can be clamped between the shoulders 30 and the distal end of the clamping member 12 as shown in FIG. 3 to create a liquid-tight seal about the hole H using the O-ring 18. The shoulders 30 thereby anchor the plumbing fitting assembly 10 against the distal surface of the vessel wall W when it is installed in the hole H.

Each of the gaps 26 has a length LG extending from a proximal end defined by the proximal end portion of the anchor member 14 to a distal end defined by the distal end of the anchor member (FIG. 1). The length LG of at least one of the gaps 26 is sized so that the gap is exposed on the distal end portion of the vessel wall W when the plumbing fitting assembly 10 is fitted to the vessel wall as shown in FIG. 3. As a result, liquid at the distal surface of the vessel wall W can drain through the gap 26 into the plumbing fitting assembly 10. In contrast to prior art devices such as bulkhead fittings, when the plumbing fitting assembly 10 is installed in the bottom wall W of a tank or other vessel, no "skin" of liquid is formed along the bottom of the interior of the tank because all of the liquid adjacent the hole H can drain through the plumbing fitting assembly.

Figure 4:
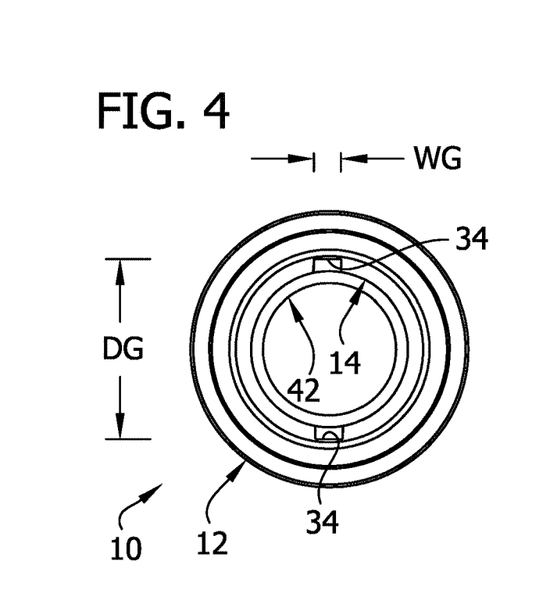
FIG. 4 is a proximal end elevation of the assembled plumbing fitting assembly.
Figure 4A:
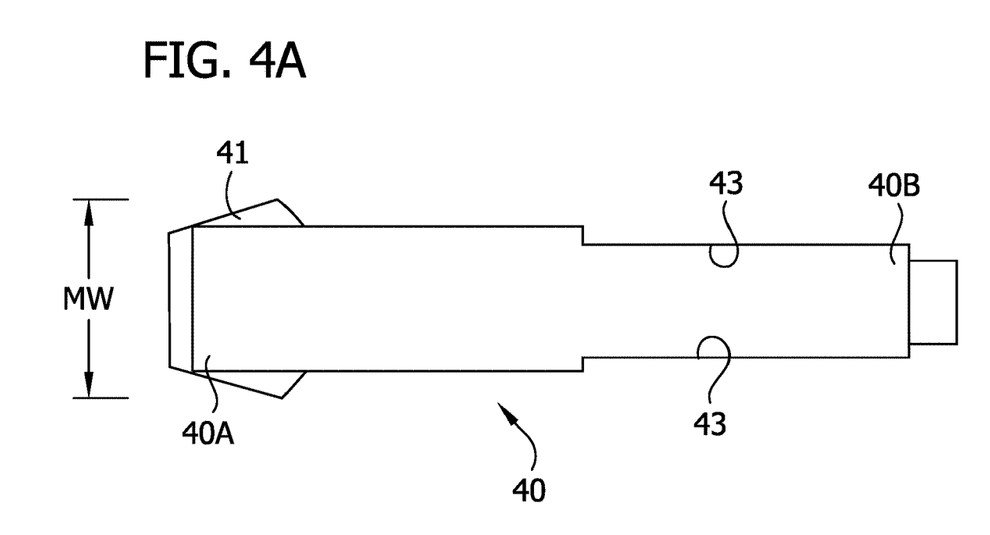
FIG. 4A is a side elevation of a tool for installing the plumbing fitting assembly.
Figure 4B:
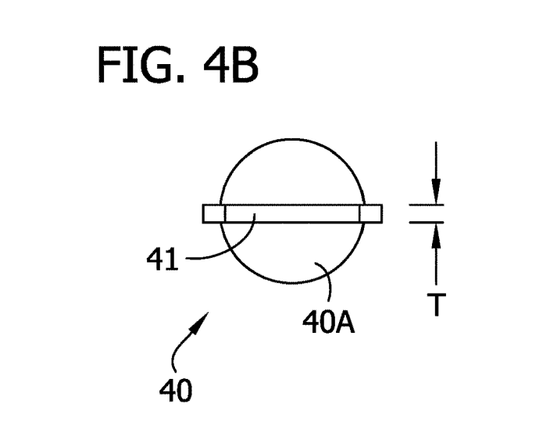
FIG. 4B is a distal end elevation of the tool of the tool.
Figure 4C:
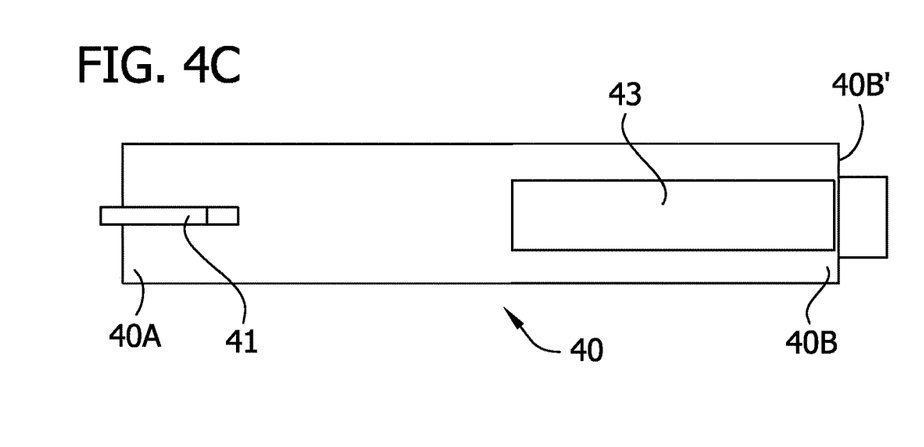
FIG. 4C is a top plan view of the tool.

Referring to FIGS. 4-4C, the proximal end portion of the anchor member 14 has an interior surface that defines first and second tool-receiving grooves 34 (each, broadly a tool-receiving recess). The grooves 34 are shaped and arranged for being operatively connected to a tool, generally indicated at 40, useful for threadably advancing the anchor member 14 and the clamping member 12 with respect to one another. Each groove 34 extends radially outward to an outer boundary that, in the illustrated embodiment, tapers inward as it extends distally along the distal end segment of the groove. It is understood that other anchor members can include other numbers and arrangements of tool receiving recesses without departing from the scope of the invention. In the illustrated embodiment, tool receiving grooves 24 comprise axially extending recesses that are circumferentially spaced apart on diametrically opposite sides of the interior surface of the anchor member 14. The outermost segments of the outer boundaries of the grooves define an effective groove diameter DG, and each of the grooves has about the same width WG.

The tool 40 comprises a generally cylindrical body having a driving end portion 40A and pushing end portion 40B. It will be understood that the tool could have other shapes, arrangements, and configurations in other embodiments. The driving end portion 40A defines rotating structure 41 sized and arranged for being operatively received in (broadly, mated with) the tool-receiving recesses 34 of the anchor member 14. In the illustrated embodiment, the rotating structure 41 has a distal end oriented substantially perpendicular to the axis of the tool 40 and first and second sides that have distal end segments that slope outwardly away from one another as they extend proximally from the distal end and proximal end segments that slope inwardly toward the body of the tool as they extend proximally from the distal segments. The rotating structure 41 has a substantially constant thickness T that corresponds with the widths WG of the grooves 34. The rotating structure also has a maximum width MW that corresponds with the effective diameter DG of the grooves 34 and is smaller than the diameter of the passage 16 in the clamping member 12. Thus, the rotating structure 41 of the tool 40 is sized for being inserted through the clamping member 12 from the proximal side of the vessel wall W into the grooves 34 of the anchor member 14 received in the hole H. When the rotating structure 41 is received in the grooves 34, the grooves connect the anchor member 14 to the tool 40 for conjoint rotation with the tool about the axis A. Accordingly, an installer can rotate one of the anchor member 14 and the clamping member 12 relative to the other by gripping the clamping member and the tool 40 from the proximal side of the vessel wall W when the anchor segment 40A is received in the grooves 34. In the illustrated embodiment, wrench flats 43 are formed in the cylindrical body adjacent the pushing end portion 40B to provide a structure that is suitable for gripping with a wrench when installing the pipe fitting assembly 10.

Referring again to FIGS. 1 and 3, the plumbing fitting assembly 10 further includes a locking ring, generally indicated at 42. The locking ring 42 has a proximal end portion and a distal end portion spaced apart along the axis A. The locking ring 42 also includes an outer surface and an opposite inner surface that defines a liquid passage 44 that extends through the locking ring from the proximal end portion through the distal end portion. In general, the locking ring 42 is configured to be inserted distally into the passage 22 of the anchor member 14 when the anchor member is received in the hole H in the vessel wall W. And when the locking ring 42 is positioned in axial alignment with the fingers 24, the locking ring is configured to support the fingers 24 from bending radially inward to prevent the anchor member 14 from becoming disconnected from the vessel wall W. Furthermore, as explained below, the locking ring 42 is configured to snap into locking engagement with the fingers 24 when the locking ring is inserted into axial alignment with radially inwardly extending lips 46 (each, broadly, a locking formation) at the distal end portions of the fingers. The distal end segment of the outer surface of the locking ring slopes inward as it extends distally to provide a camming surface configured to engage the lips 46 and bend the fingers 24 radially outward as the locking ring is inserted distally into alignment with the lips.

The outer surface of the locking ring 42 defines a locking formation 48 that is sized and arranged for complementary interlocking engagement with the locking formation of the anchor member 14 (e.g., the lips 46). In the illustrated embodiment, the locking formation 48 comprises a radially inwardly extending recess and, in particular, a continuous annular recess. The recess 48 is spaced apart between the proximal end portion and the distal end portion of the locking ring 42. The recess 48 has a proximal axial end and a distal axial end that are spaced apart for lockingly receiving the lips 46 therebetween. When the locking ring 42 is inserted distally through the passage 22 of the anchor member 14 so that the lips 46 are aligned with the recess 48, the fingers 24 bend radially outwardly to pass the distal end segment of the locking ring and resiliently return toward their original configurations to snap into the recess 48. There, the proximal and distal ends of the recess 48 capture the fingers 46 to prevent axial movement of the locking ring 42. Suitably, the pushing end portion 40B of the tool 40 defines a distal facing surface 40B' (e.g., a shoulder, broadly a pushing structure) sized and arranged for engaging the proximal end of the locking ring 42 and pushing the locking ring into alignment with the radially inwardly extending lips 46 to lock the fingers 24 of the anchor member 14 into place. The pushing end portion 40B has a diameter (broadly, a width) that is smaller than the maximum width MW of the rotating structure.

In the illustrated embodiment, the distal axial end of the recess 48 slopes inwardly toward the proximal axial end and the proximal axial end is oriented substantially perpendicular to the axis A. The perpendicular proximal end prevents the locking ring from being inserted distally past alignment with the lips 46 in use. The proximal end portion of the locking ring 42 that extends proximally of the recess 48 is sized so that, when the plumbing fitting 10 is installed in the hole H, the proximal end of the locking ring is spaced apart from the distal surface of the wall W (e.g., the axial extents of the lips 46 and the proximal end portion of the locking ring are smaller in combination than the axial extent of the catch portions 28). As a result, the locking ring 42 does not interfere with the flow of liquid through the gaps 26 between the fingers 24 at the distal surface of the wall W. The sloped distal end of the recess 48 provides a surface for opposingly engaging a chamfered distal inner edge portion of the lips 46. Engagement between the opposing sloped surfaces can cause the fingers 24 to bend radially outward for removal of the locking ring 42 after it is installed by application of a large proximal force on the locking ring.

A method of using the plumbing fitting assembly 10 to form a liquid connection at the transverse hole H in the wall W of the vessel V will now be briefly described. In one embodiment, the plumbing fitting assembly 10 is combined as a kit with the tool 40. The installer can install the plumbing fitting assembly 10 with only unilateral axis to the proximal side of the vessel wall W using the following process: If not already formed, the installer initially drills and deburrs the hole H in the vessel wall W. When the hole H is formed, the installer inserts the distal end portion of the anchor member 14 through the hole. As explained above, camming engagement between the sloped distal end segments of the catch portions 28 of the fingers 24 and the portions of the wall W that define the hole H cause the fingers to bend radially inward to fit into the smaller diameter hole. When the catch portions 28 pass the distal boundary of the wall W, the fingers 24 resiliently return toward their unbent configurations. In one embodiment, the threads formed on the outer surface of the proximal end segment of the anchor member 14 are larger than the diameter DH of the hole H to prevent the proximal end portion of the anchor member from passing distally through the hole into the inaccessible distal interior of the vessel V. At any time during the installation, the installer can place the O-ring 18 into the groove 20 of the clamping member 12. After the O-ring 18 is installed, the installer can begin to thread the distal end portion of the clamping member 12 onto the proximal end portion of the anchor member 14 before or after the locking ring 42 is installed.

In one embodiment the installer installs the locking ring 42 using the tool 40. Suitably, the locking ring 42 is installed before the clamping member 12 is fully tightened onto the anchor member 14 because the tightened engagement between the shoulders 30 of the catch portions 28 and the vessel wall W can inhibit the locking ring from snapping into place. The installer places the locking ring 42 into the anchor member 14 received in the hole H and inserts the pushing end portion 40B of the tool 40. The shoulder 40B' engages the proximal end of the locking ring 42. By inserting the tool 40 distally while holding the anchor member 14 in place, the user inserts the locking ring 42. When the locking ring 42 is inserted into engagement with the lips 46, the sloped distal end segment of the outer surface cammingly engages the lips and bends the fingers 24 radially outward as explained above. When the locking ring 42 is inserted further so that that lips 46 are aligned with the annular recess 48, the fingers 24 snap back into place and the lips are lockingly received in the recess to limit further axial movement of the locking ring with respect to the anchor member 14. In this position, the locking ring 42 provides radial support for the fingers 24 to prevent the fingers from bending radially inward to become dislodged from the hole H.

To tighten the clamping member 12 onto the anchor member 14 after the locking ring 42 has been installed, the installer inserts the rotating structure 41 of the tool 40 through the passage 16 of the clamping member 12 and into the tool receiving grooves 34. Using the tool 40 to fix the anchor member 14 against rotation, the installer rotates the clamping member 12 relative to the anchor member to threadably tighten the clamping member onto the anchor member. In the alternative, the installer can brace the clamping member 12 and rotate the anchor member 14 using, for example, a wrench gripping the wrench flats 43 of the tool 40. When the clamping member 12 is fully tightened (e.g., hand tightened), the vessel wall W is compressed between the shoulders 30 of the catch portions 28 and the distal end surface of the clamping member 12. The O-ring 18 is compressed against the proximal surface of the vessel wall W to form a liquid-tight seal about the hole H.

With the plumbing fitting assembly 10 installed at the hole H in the vessel wall W, the installer can connect a liquid-receiving device such as a pipe, a valve, etc., to the proximal end portion of the clamping member 12. In the illustrated embodiment, the installer uses a solvent weld to create the connection. But in other embodiments of plumbing fitting assemblies, it is understood that the installer can use another type of liquid-tight connection for which the clamping member 12 is designed. Installed, the plumbing fitting assembly 10 creates a liquid-tight connection between the distal side of the vessel V and the liquid-receiving device that is connected to the clamping member 12. Those skilled in the art will now appreciate that the plumbing fitting assembly can, in certain embodiments, be used, for example, to unilaterally add or replace a drain fitting on a vessel V (e.g., a toilet bowl tank, a rainwater tank or barrel, a drum, a bilge vessel, a paint can, a cooler, a condensate pan, a drip pan, an HVAC duct, a bucket, a drain conduit, a gas tank, etc.) and connect a drain hose, valve, drain pipe, etc., to the new drain fitting.

Figure 5:
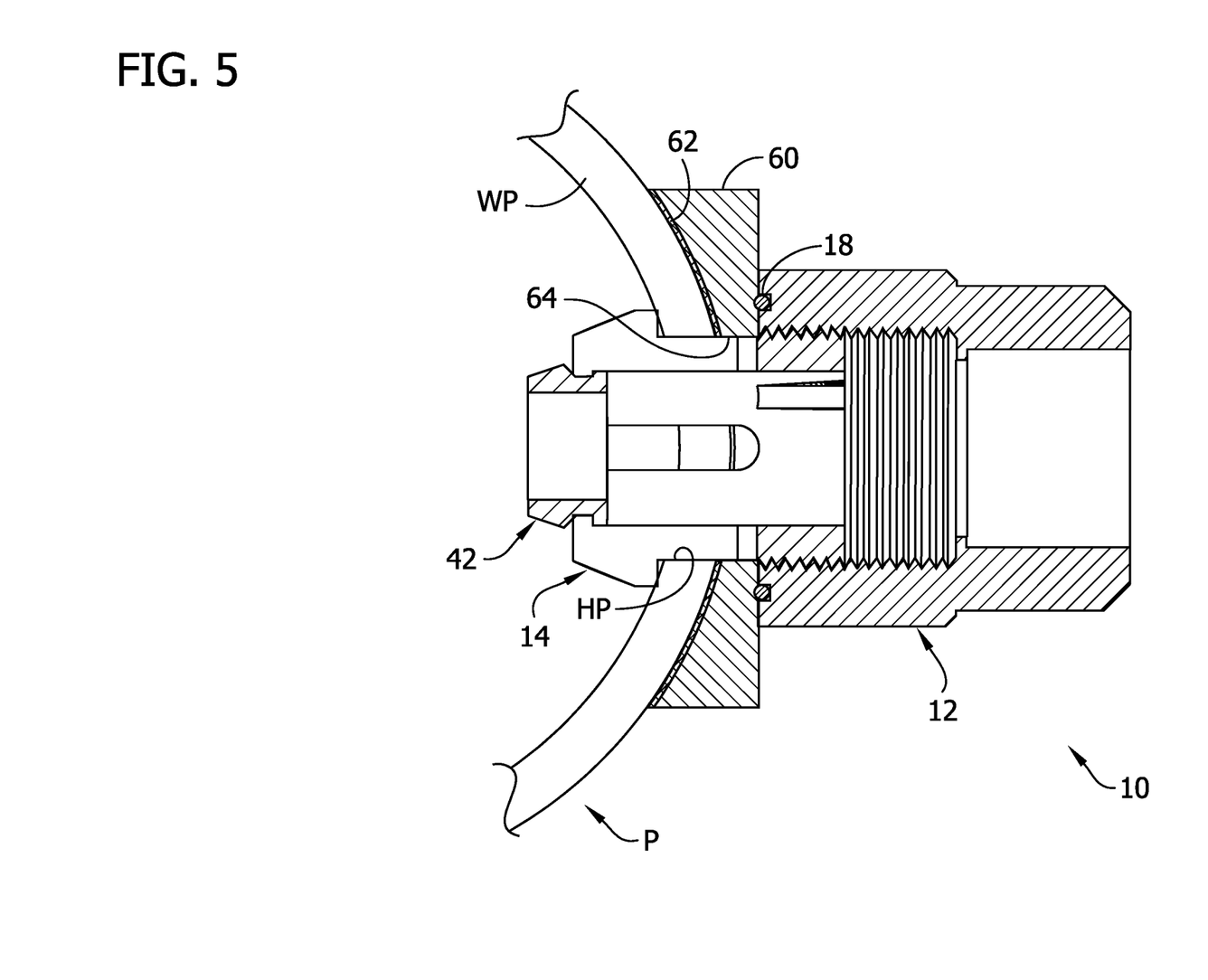
FIG. 5 is a cross section of the plumbing fitting assembly installed with a saddle adaptor on the wall of a pipe.

Referring to FIG. 5, in one embodiment, the plumbing fitting assembly 10 is used in combination with a saddle adaptor 60 to form a lateral liquid connection (e.g., a tee or a wye connection) at a hole HP formed in the wall WP of a pipe P (which is broadly understood to be a type of vessel). The saddle adaptor 60 includes a rigid or semi-rigid body defining a flat proximal end and an arcuate distal end sized and shaped to conform to the outer surface of the wall WP of the pipe P. The adaptor 60 also defines a passage 64 extending from the proximal end through the distal end for conveying liquids. A compressive gasket 62 extends over the arcuate distal end of the saddle member 60. In use the saddle member is installed over the proximal end portion of the anchor member 14 before the clamping member 12 is installed. The clamping member 12 is installed and clamps the gasket 62 against the outer surface of the wall WP of the pipe P. The gasket 62 creates a liquid-tight seal about the hole HP between the saddle member 60 and the wall WP, and the O-ring 18 creates a liquid-tight seal about the passage 64 between the proximal end of the saddle member 18 and the distal end of the clamping member 12.

Figure 8:
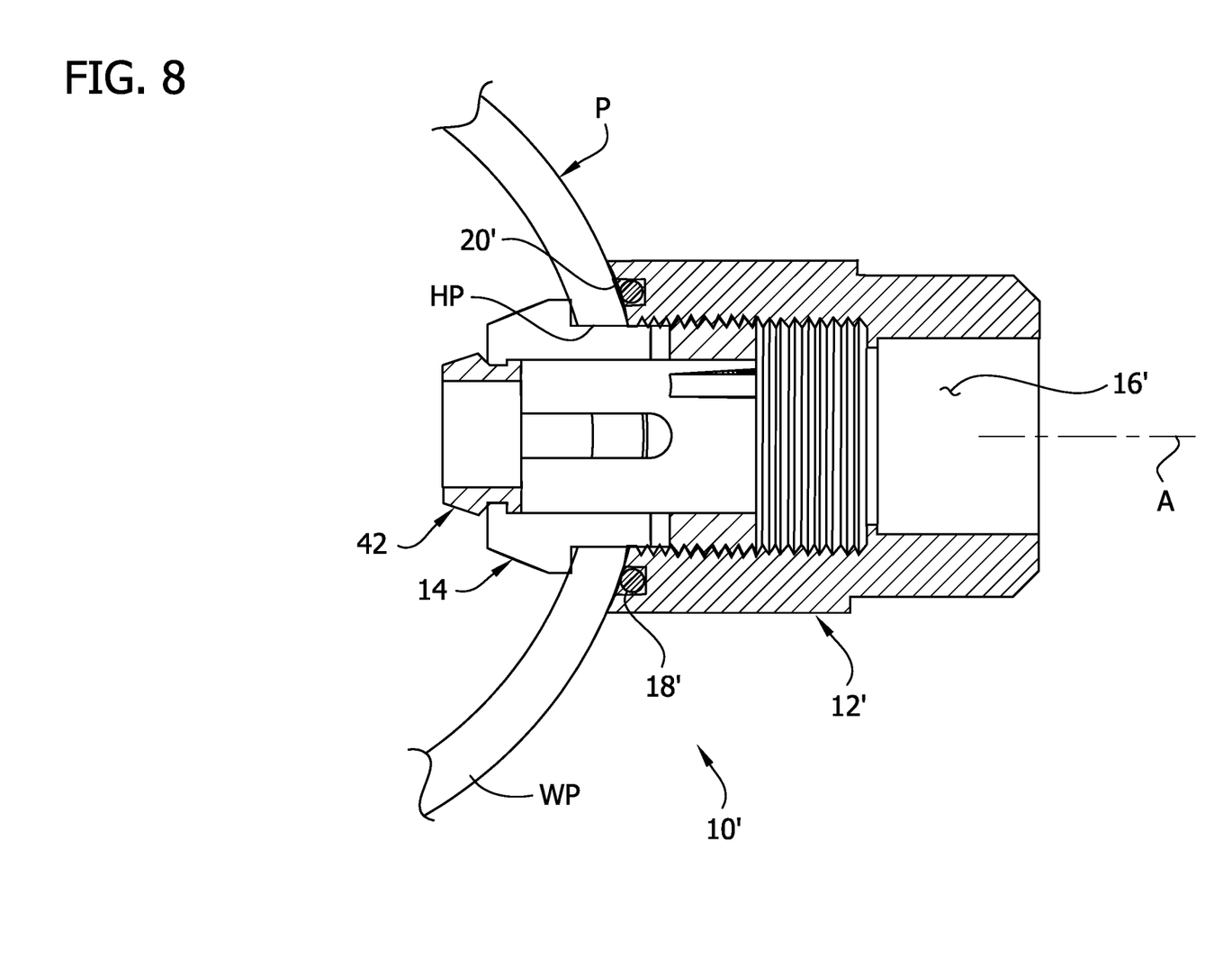
FIG. 8 is a cross section of the plumbing fitting assembly with a modified clamping member for being connected to the wall of the pipe.
Figure 9:
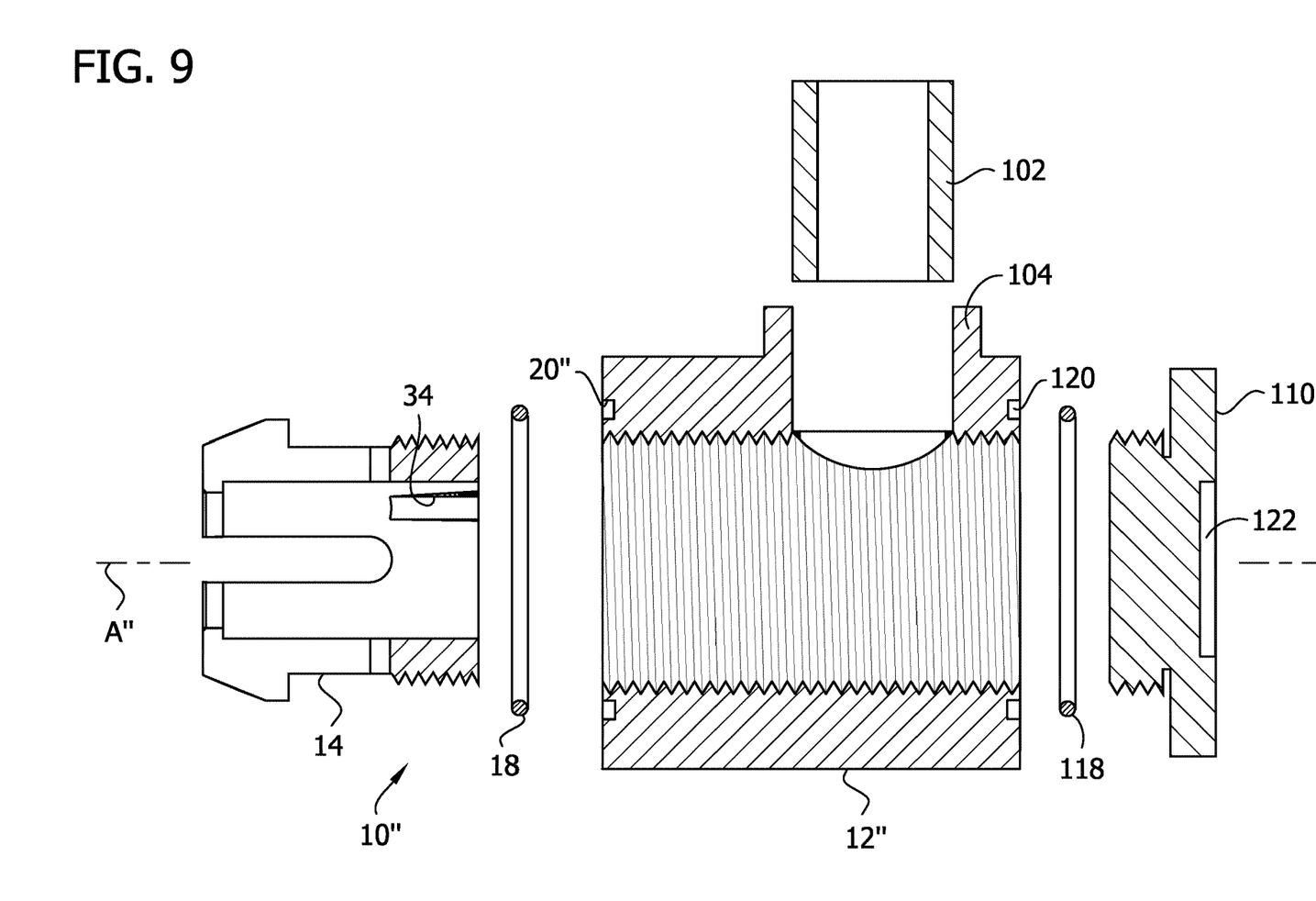
FIG. 9 is an exploded cross-section of another plumbing fitting assembly.

Referring to FIG. 8, in another embodiment, a plumbing fitting assembly 10' includes a modified clamping member 12' in lieu of the saddle adaptor 60 for forming a lateral liquid connection at the hole HP in the wall WP of the pipe P. The clamping member 12' has an arcuate distal end sized and shaped to conform to the outer surface of the wall WP of the pipe P. The distal end of the clamping member 12' defines a groove 20' configured for receiving an arcuate O-ring seal 18' configured for forming a liquid-tight seal between the proximal surface of the wall WP and the distal end of the clamping member when the plumbing fitting assembly 10' is installed in the hole HP. In essence, the clamping member 12' includes an integral saddle portion that functions in much the same manner as the saddle adaptor 60 described above in reference to FIG. 6. But because the distal saddle portion of in FIG. 8 is an integral portion of the clamping member 12', it interferes with rotation of the clamping member about the axis A when the clamping member is operatively engaged with the pipe P. Accordingly, to install the plumbing fitting assembly 10' of FIG. 8, the tool 40 is inserted through the passage 16' into the tool receiving recesses 34 of the anchor member 14 and is rotated to rotate the anchor member relative to the clamping member 12' to threadably tighten the plumbing fitting assembly onto the wall WP of the pipe P and form a liquid-tight seal about the hole HP.

Figure 6:
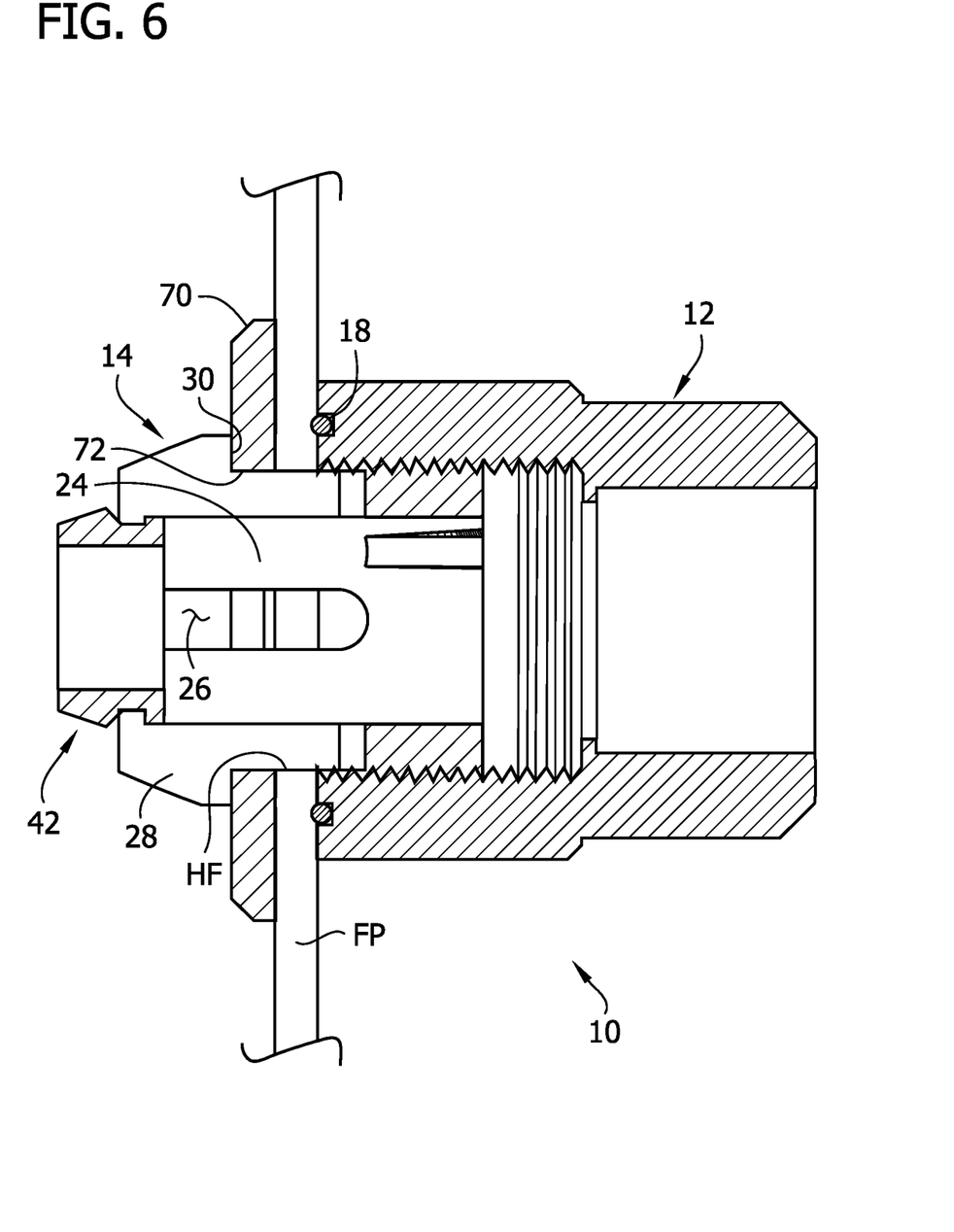
FIG. 6 is a cross section of the plumbing fitting assembly installed with a rigid washer on a flexible panel.

Referring to FIG. 6, in certain embodiments, the plumbing fitting assembly 10 is used in combination with a backing washer 70 to form a liquid connection at a hole HF formed in a flexible panel FP (for example, a bag panel, a roofing membrane, a pool cover, a boat cover, etc.). The backing washer 70 comprises a rigid or semi-rigid material and has proximal and distal ends and a hole 72 extending from the proximal end through the distal end. In use, the distal end portion of the anchor member 14 is inserted distally through the hole HF in the flexible panel FP and then through the hole 72 in the backing washer 70. The proximal end of the washer 70 engages the distal surface of the flexible panel FP. When the clamping member 12 is threaded onto the anchor member 14, the shoulders 30 tighten against the washer 70 and the flexible panel is compressed between the washer and the distal end of the clamping member to form a liquid tight seal at the interface between the O-ring 18 and the flexible panel FP. Suitably, the gaps 26 between the fingers 24 are exposed distally of the washer to allow passage of liquid through the gaps. Thus, it can be seen that the plumbing fitting assembly 10 can be used in combination with the backing washer 70 to form a liquid connection at a hole in any of various types of flexible panels FP.

Figure 7:
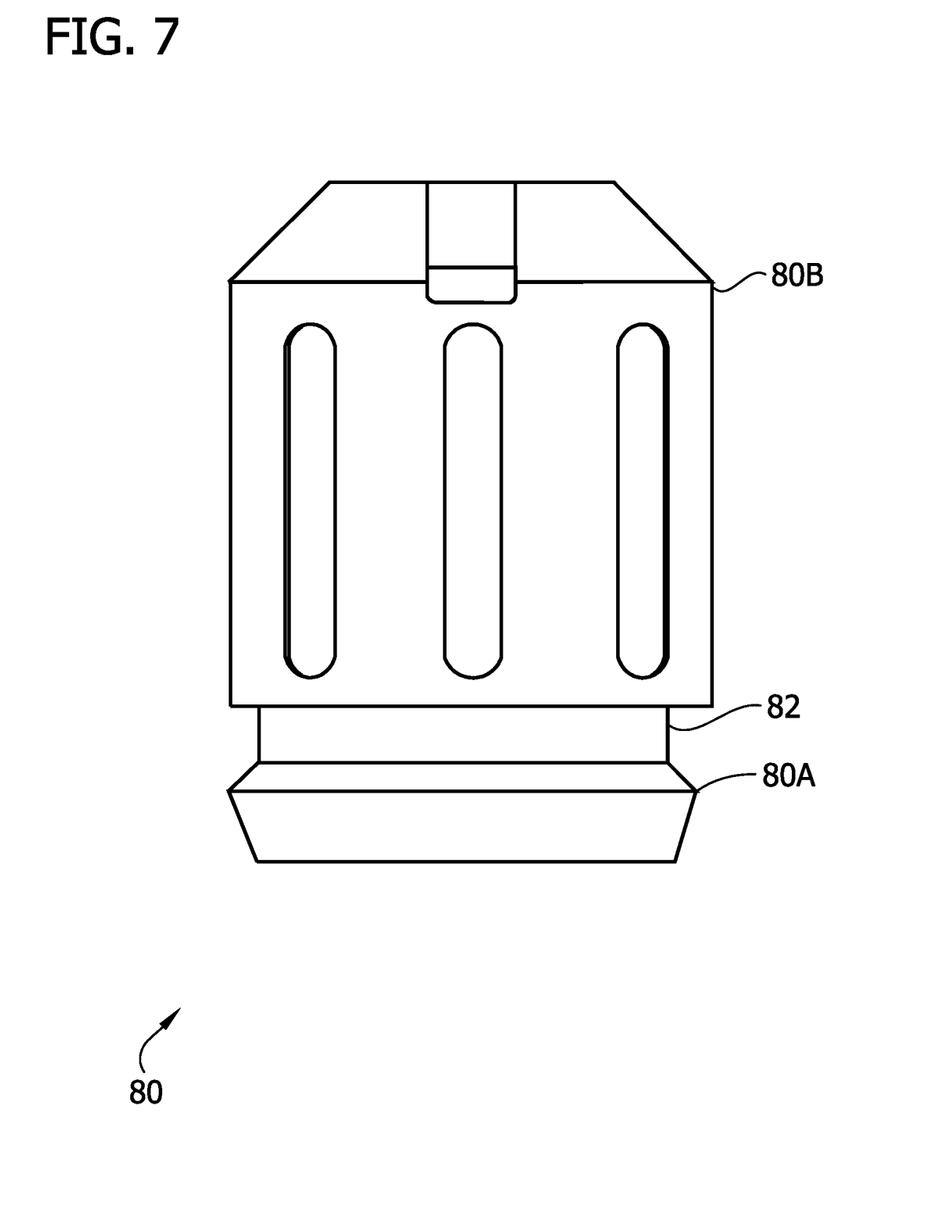
FIG. 7 is an elevation of vent cap for installation on a distal end portion of the anchor member.

Referring to FIG. 7, in one application, the anchor member 14 and the backing washer 70 are used in combination with a drain cap 80 to form a roof drain. The proximal end portion of the anchor member 14 is threadably started into the distal (threaded) end of the clamping member 12. A hole created in a roof membrane is then pushed over the distal end of the anchor member 14. Then backing washer 70 can then be pushed over the distal end of the anchor member 14, clearing the catch portion 28 on the distal end of the anchor member 14 and coming to rest on the distal side of the roof membrane. Subsequently, the drain cap 80 can be installed in the distal end portion of the anchor member 14. In the illustrated embodiment, the drain cap 80 comprises a connection end portion 80A and a cap end portion 80B. The cap end portion 80B has a cylindrical side wall and a top wall that define a plurality of drain openings. The connection end portion defines an annular recess 82 sized and arranged for lockingly receiving the lips 46 of the distal end portion of the anchor member 14 in the same manner as the annular recess 48 of the locking ring 42. An outer surface of the connection end portion 80A slopes inwardly as it extends away from the annular recess to define a camming surface for bending the fingers 24 radially outwardly when the connection end portion is inserted along the axis A into distal end of the passage 22 of the anchor member 14. When the recess 82 is aligned with the lips 46, the fingers resiliently return to their unbent configurations to lock the lips into the recess, thus mounting the drain cap 80 on the anchor member 14. The anchor member 14 is threadably tightened into the threaded pipe such that proximal end of the washer 70 is compressed against the flexible membrane of the roof to form a seal about the hole in the roof.

Referring to FIG. 8, in another embodiment, the plumbing fitting assembly 10" includes a modified clamping member 12" for forming a right angle connection with a fluid conveying structure such as the pipe 102. The clamping member 12" has a distal end defining a groove 20" for receiving the O-ring 18. As above, the proximal end portion of the anchor member 14 is configured to be threadably received in the distal end portion of the clamping member 12" to fluidly connect the pipe fitting assembly 10" to the wall W of a vessel V. Unlike the clamping member 12, however, the clamping member 12" defines a lateral connection element 104 extending transverse to the axis A" for forming a fluid connection with the pipe 102 or another liquid-conveying structure extending transverse to the axis. The proximal end portion of the clamping member 12" defines an opening that is internally threaded. The opening allows the tool 40 to be inserted into the tool-receiving recesses 34 through the clamping member 12" to threadably rotate one of the clamping member and the anchor member 14 with respect to the other. A plug 110 is configured to be threadably received in the internally threaded proximal end portion of the clamping member 12" to seal the proximal end portion. The proximal end of the clamping member 12" defines a groove 120 for receiving a proximal O-ring 118. When the plug 110 is received in the proximal end portion of the clamping member a flange portion of the plug engages the O-ring to form a liquid-tight seal about the proximal opening. In the illustrated embodiment, the proximal end portion of the plug 110 defines a recess 122 for receiving a distal end portion of the tool 40 so that the tool can be used to threadably rotate the plug with respect to the clamping member 12". The removable plug 110 can be removed to allow for cleanout of the pipe fitting 10" while the pipe 102 is installed in the lateral element 104 and without removing the pipe 102 or removing the fitting 10" from the wall W of the vessel V.

When introducing elements of the present invention or the preferred embodiments(s) thereof, the articles "a", "an", "the" and "said" are intended to mean that there are one or more of the elements. The terms "comprising", "including" and "having" are intended to be inclusive and mean that there may be additional elements other than the listed elements.

In view of the above, it will be seen that the several objects of the invention are achieved and other advantageous results attained.

As various changes could be made in the above products without departing from the scope of the invention, it is intended that all matter contained in the above description and shown in the accompanying drawings shall be interpreted as illustrative and not in a limiting sense.

What is claimed is:

1. A plumbing fitting assembly for forming a plumbing fitting at a transverse hole in a structure, the plumbing fitting assembly comprising:
   a clamping member comprising a distal end portion and a proximal end portion, the clamping member defining a liquid passage extending through the clamping member from a first port formed in the distal end portion through a second port spaced apart from the distal end portion, the distal end portion of the clamping member being internally threaded and having an end surface configured for receiving a seal that extends circumferentially about the first port for sealingly engaging a proximal side of the structure about the port;
   an anchor member comprising a distal end portion and a proximal end portion spaced apart along an axis and defining a liquid passage extending from the distal end portion through the proximal end portion, the anchor member being sized and arranged for being received in the transverse hole and the proximal end portion being configured for being threadably mated with the distal end portion of the clamping member when the anchor member is received in the transverse hole, at least a segment of the distal end portion being resiliently bendable in a radial direction, the distal end portion including a radially outwardly extending catch portion defining a proximal-facing shoulder sized and arranged for being tightened against a distal side of the structure when the proximal end portion of the anchor member is threadably mated with the distal end portion of the clamping member, the distal end portion of the anchor member having an interior surface including an anchor member locking formation; and
   a locking ring having a proximal end portion, a distal end portion, an outer surface, and an inner surface defining a liquid passage extending through the locking ring from the proximal end portion through the distal end portion, the outer surface including a locking ring locking formation sized and arranged for complementary interlocking engagement with the locking formation of the anchor member, the locking ring being configured for insertion through the liquid passage of the anchor member along the axis of the anchor member whereby the locking formation of the locking ring lockingly engages the locking formation of the anchor member;
   wherein the distal end portion of the anchor member comprises a plurality of axially extending fingers circumferentially spaced apart from one another to define a plurality of gaps therebetween, the proximal end portion of the anchor member defining proximal ends of the gaps, the proximal end portion of the locking ring being spaced apart distally of the proximal ends of the gaps when the locking formations of the locking ring and the anchor member are lockingly engaged.

2. A plumbing fitting assembly as set forth in claim 1 wherein the locking formation of the locking ring comprises a radially inwardly extending recess.

3. A plumbing fitting assembly as set forth in claim 2 wherein the recess comprises a continuous annular recess.

4. A plumbing fitting assembly as set forth in claim 2 wherein the recess has a proximal axial end and a distal axial end, one of the proximal and distal axial ends sloping toward the other of the axial ends.

5. A plumbing fitting assembly as set forth in claim 4 wherein the locking formation of the anchor member comprises a radially inwardly extending lip having a proximal axial end and a distal axial end, one of the proximal end distal axial ends of the lip corresponding with said one of the proximal and distal axial ends of the recess sloping toward the other of the axial ends of the lip.

6. A plumbing fitting assembly as set forth in claim 4 wherein the exterior surface of the locking ring is substantially non-tapered as it extends along the other of the proximal end portion of the locking ring and the distal end portion of the locking ring away from the locking formation of the locking ring.

7. A plumbing fitting assembly as set forth in claim 1 wherein the locking formation of the locking ring is spaced apart between the proximal end portion and the distal end portion of the locking ring, the exterior surface of the locking ring tapering radially inwardly as it extends along one of the proximal end portion of the locking ring and the distal end portion of the locking ring away from the locking formation of the locking ring.

8. A plumbing fitting assembly as set forth in claim 1 wherein the proximal end portion of the anchor member has an interior surface defining at least one tool-receiving recess shaped and arranged for mating with a rotating structure of a tool inserted distally through the liquid passages of the clamping member and the anchor member to connect the anchor member to the tool for conjoint rotation with the tool about the axis of the anchor member for threadably advancing the anchor member into the clamping member using the tool.

9. A plumbing fitting assembly as set forth in claim 8 wherein the tool receiving recess comprises a first axially extending groove, the interior surface of the proximal end portion of the anchor member further defining a second axially extending groove circumferentially spaced apart from the first axial groove.

10. A plumbing fitting assembly as set forth in claim 9 wherein at least one of the first and second grooves has an outer boundary that tapers inward as it extends distally.

11. A kit comprising the plumbing fitting assembly as set forth in claim 8 in combination with the tool.

12. A kit as set forth in claim 11 wherein the tool comprises an anchor engaging segment having a first width, the tool further comprises a pushing structure having a second width that is smaller than the first width and defining a surface sized and arranged for engaging an end of the locking ring.

13. A kit as set forth in claim 12 wherein the locking ring is configured to snap into locking engagement with the fingers when the locking ring is inserted to a locked axial position with respect to the fingers, the tool being sized and arranged for inserting the locking ring to the locked axial position when said surface of the pushing structure is engaged with the end of the locking ring.

14. A plumbing fitting assembly as set forth in claim 1 wherein the structure in which the transverse hole is formed comprises a flexible, liquid impermeable panel; the plumbing fitting assembly further comprising a rigid backing washer having a distal end, a proximal end, and a hole extending from the proximal end through the distal end sized for receiving the proximal end portion of the anchor member therethrough, the distal end being sized and arranged to engage the shoulder of the catch portion when the anchor member is received in the hole and the proximal end being sized and arranged to engage a distal surface of the flexible panel when the anchor member is received in the transverse hole whereby the rigid backing washer compresses the flexible panel against the distal end portion of the clamping member when the clamping member is threadably tightened into the internally threaded passage.

15. A plumbing fitting assembly as set forth in claim 14 wherein the fingers of the anchor member define gaps therebetween, said gaps sized and arranged to be exposed distally of the distal end of the washer when the washer compresses the flexible panel against the distal end portion of the clamping member.

16. A plumbing fitting as set forth in claim 14 further comprising a drain cap securable to the distal end portion of the anchor member.

17. A plumbing fitting as set forth in claim 16 wherein the drain cap comprises an annular proximal end portion defining an exterior annular recess sized and arranged for lockingly receiving radially inwardly extending lips of the fingers therein to secure the plumbing fitting to the distal end portion of the anchor member.

18. A plumbing fitting assembly as set forth in claim 1 wherein the locking formation of the locking ring is configured to snap into locking engagement with the locking formation of the anchor member.

* * * * *